(12) United States Patent
Li et al.

(10) Patent No.: US 10,753,073 B2
(45) Date of Patent: Aug. 25, 2020

(54) SLIDE-EASY SLIDE SEAT STRUCTURE FOR PORTABLE AND LIFTABLE ROD

(71) Applicant: Runner (Xiamen) Corp., Xiamen (CN)

(72) Inventors: Kai Li, Xiamen (CN); You-Yu Liang, Xiamen (CN)

(73) Assignee: RUNNER (XIAMEN) CORP., Xiamen (CN)

( * ) Notice: Subject to any disclaimer, the term of this patent is extended or adjusted under 35 U.S.C. 154(b) by 0 days.

(21) Appl. No.: 16/419,808

(22) Filed: May 22, 2019

(65) Prior Publication Data

US 2019/0382992 A1 Dec. 19, 2019

(30) Foreign Application Priority Data

Jun. 15, 2018 (CN) .................... 2018 2 0933892 U

(51) Int. Cl.
| | |
|---|---|
| *F16M 13/02* | (2006.01) |
| *E03C 1/02* | (2006.01) |
| *E03C 1/06* | (2006.01) |
| *A47K 3/28* | (2006.01) |
| *B05B 1/18* | (2006.01) |

(52) U.S. Cl.
CPC .......... *E03C 1/066* (2013.01); *F16M 13/022* (2013.01); *A47K 3/281* (2013.01); *B05B 1/18* (2013.01); *E03C 1/02* (2013.01); *E03C 1/06* (2013.01)

(58) Field of Classification Search
CPC .. A47K 3/281; E03C 1/06; E03C 1/02; F16M 13/022; B05B 1/18
See application file for complete search history.

(56) References Cited

U.S. PATENT DOCUMENTS

| | | | | |
|---|---|---|---|---|
| 5,896,599 A | * | 4/1999 | Bosio ...................... | E03C 1/066 285/322 |
| 7,407,140 B2 | * | 8/2008 | Sen ......................... | E03C 1/066 239/283 |
| 8,430,344 B2 | * | 4/2013 | Cai .......................... | B05B 1/16 239/587.4 |
| 2019/0345700 A1 | * | 11/2019 | Davidson ................ | E03C 1/066 |

FOREIGN PATENT DOCUMENTS

CN 201284500 Y * 8/2009

* cited by examiner

*Primary Examiner* — Tan Le
(74) *Attorney, Agent, or Firm* — Chun-Ming Shih

(57) ABSTRACT

A slide-easy slide seat structure for a portable and liftable rod, that includes: a slide sleeve, a main body, an insertion seat, and a hold tight mechanism. The slide sleeve includes a hollow portion and a through-hole, the main body is fixed to the hollow portion of the slide sleeve, one end of slide sleeve is connected to the insertion seat. Wherein, the hold tight mechanism includes a control sway rod, a movable piece, a hold tight piece, and a restoring spring. One end of the control sway rod is disposed in the main boy, and a central portion of the control sway rod is hinged to the main body. One end of restoring spring is disposed in the main body, and the other end of the restoring spring is connected to the movable piece.

10 Claims, 5 Drawing Sheets

SLIDE-EASY SLIDE SEAT STRUCTURE FOR PORTABLE AND LIFTABLE ROD

BACKGROUND OF THE INVENTION

Field of the Invention

The present invention relates to a liftable rod, and in particular to a slide-easy slide seat structure for a portable and liftable rod.

The Prior Arts

In general, for a shower device, a slide seat is provided on a lifting guide rod to fix a shower head, thus the slide seat is able slide upward or downward the lifting guide rod to fix the height of the shower. The hold tight mechanism on the slide seat is used to the slide seat onto the lifting guide rod, to fix the slide seat at a certain height. When the hold tight mechanism is released, the slide seat is able to move upward or downward along the lifting guide rod to adjust height. Presently, the hold tight mechanism uses press button to press and adjust the height. In this way of pressing, it requires finger to press the button, yet it requires greater force to make the pressing operation to work. To some elderly or handicapped persons, this pressing operation is rather difficult, or it is not able to function at all. Therefore, it exists a need on the market for a slide-easy slide seat structure for a portable and liftable rod, to effectively control the ups and downs of the lifting rod while saving effort to operate the structure.

Therefore, presently, the design and performance of the shower device is not quite satisfactory, and it leaves much room for improvements.

SUMMARY OF THE INVENTION

In view of the problems and drawbacks of the prior art, the present invention provides a slide-easy slide seat structure for a portable and liftable rod to overcome the deficiency of the existing technology.

The present invention provides a slide-easy slide seat structure for a portable and liftable rod, that includes: a slide sleeve, a main body, an insertion seat, and a hold tight mechanism. The slide sleeve includes a hollow portion and a through-hole. The main body is fixed to the hollow portion of the slide sleeve, one end of slide sleeve is connected to the insertion seat. Wherein, the hold tight mechanism includes a control sway rod, a movable piece, a hold tight piece, and a restoring spring. One end of the control sway rod is disposed in the main boy, and a central portion of the control sway rod is hinged to the main body. One end of restoring spring is disposed in the main body, and the other end of the restoring spring is connected to the movable piece. The movable piece is disposed in the main body and having a slant slide face C. The slant slide face C approaches a liftable rod A along a longitudinal direction. One end of hold tight piece is located close to the movable piece, to act in cooperation with the slant slide face C of the movable piece; the other end of the hold tight piece is pressed against the liftable rod A. The hold tight piece is detached from the liftable rod A through its cooperation with the control sway rod and the movable piece.

In an aspect of the present invention, the slide-easy slide seat structure for a portable and liftable rod a further includes: a rotation axis connection rod, disposed in the main body, and is located opposite to the movable piece, when the control sway rod sways, it brings the rotation axis connection rod to press the movable piece downward, then movable piece brings the hold tight piece to detach from the liftable rod A.

In another aspect of the present invention, the rotation axis connection rod includes an extension plate and a press plate, on both sides of the control sway rod are each disposed a protrusion portion, the protrusion presses against the press plate, to bring the extension plate to press the movable piece downward.

In yet another aspect of the present invention, the press plate has an indent portion, the dent portion acts in cooperation with the protrusion portion.

In a further aspect of the present invention, the hold tight piece includes a friction pad and a protrusion plate, a front face of the friction pad is pressed on the liftable rod A, a back face of the friction pad is disposed the protrusion plate, the protrusion plate has a slant face, the slant face is close to the friction pad along a longitudinal direction, the protrusion plate acts in sliding cooperation with the movable piece.

In an aspect of the present invention, on a top surface of the slant face C of the movable piece is disposed a protrusion table.

In another aspect of the present invention, one end of the control sway rod extending inside the main body is disposed an extension portion, both sides of the movable piece are each disposed a receiving flat table acting in cooperation with the extension portion.

In yet another aspect of the present invention, the control sway rod includes a control button, and a connection press rod connected thereto, with one end of the connection press rod extending into the main body, and with the other end of the connection press rod extending outside the main body, and is connected to the control button.

In a further aspect of the present invention, an inner cover is disposed between the control button and the main body, the inner cover is provided with a narrow hole portion, for the connection press rod to move along the narrow hole portion.

In an aspect of the present invention, around a periphery of the main body is disposed spring plates in symmetry, on the spring plate is disposed an indent bag, on the control sway rod is disposed a protrusion bag acting in cooperation with the indent bag.

Compared with the existing technology, the advantages of the present inventions are that: it requires less effort and force to operate, it facilitates elderly and handicapped person to take a shower, it is compact in structure and is convenient to use, while giving a good sense of aesthetics.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

In the following, an embodiment is used to describe the various details of the present invention. However, it does not mean that this embodiment represents all the embodiments of the present invention. Other embodiments can be envisaged by people familiar with this field, and thus they all fall into the scope of the present invention.

Refer to FIGS. 1 to 7 respectively for a cross section view of a slide-easy slide seat structure for a portable and liftable rod according to an embodiment of the present invention; an exploded view of a slide-easy slide seat structure for a portable and liftable rod according to an embodiment of the present invention; a cross section view of a slide seat according to an embodiment of the present invention; an enlarged schematic diagram of a hold tight piece and a movable piece according to an embodiment of the present invention; a cross section view of a slide seat according to another embodiment of the present invention; a cross section view of a slide seat in a hold tight state according to the present invention; and an exploded view of a slide seat in a hold tight state according to the present invention.

Figure 1:
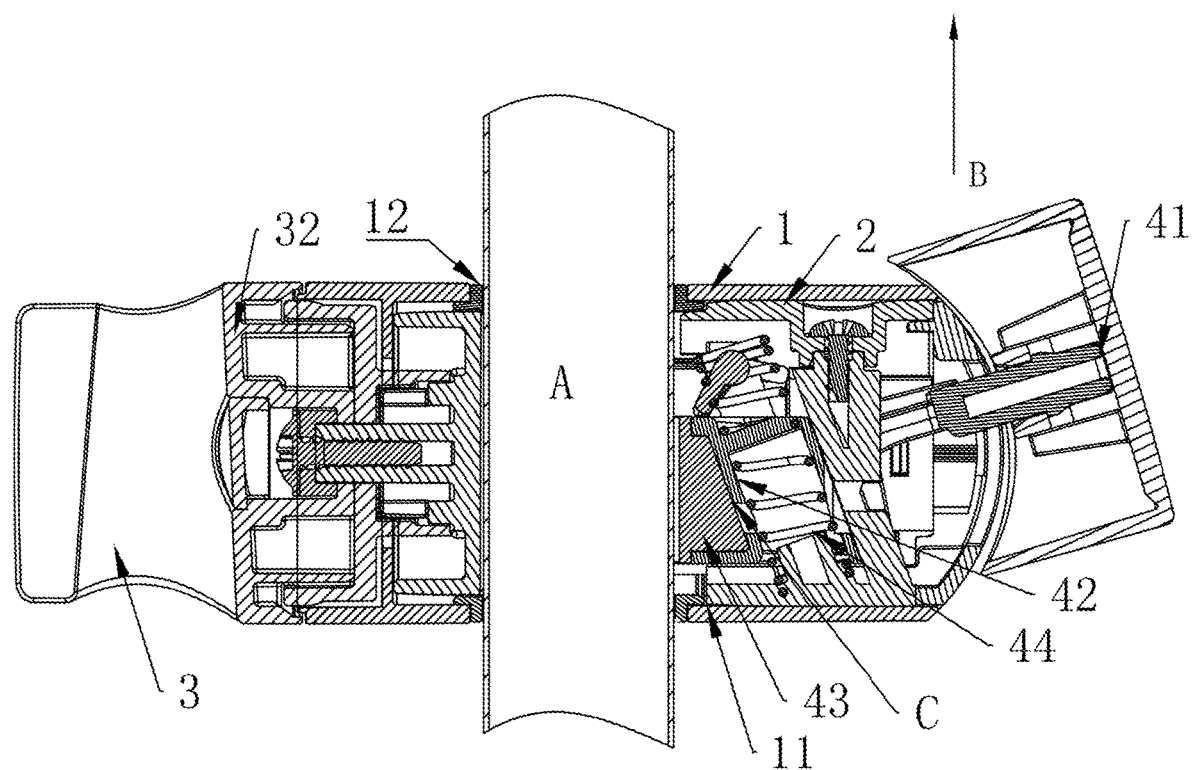
FIG. 1 is a cross section view of a slide-easy slide seat structure for a portable and liftable rod according to an embodiment of the present invention.
Figure 2:
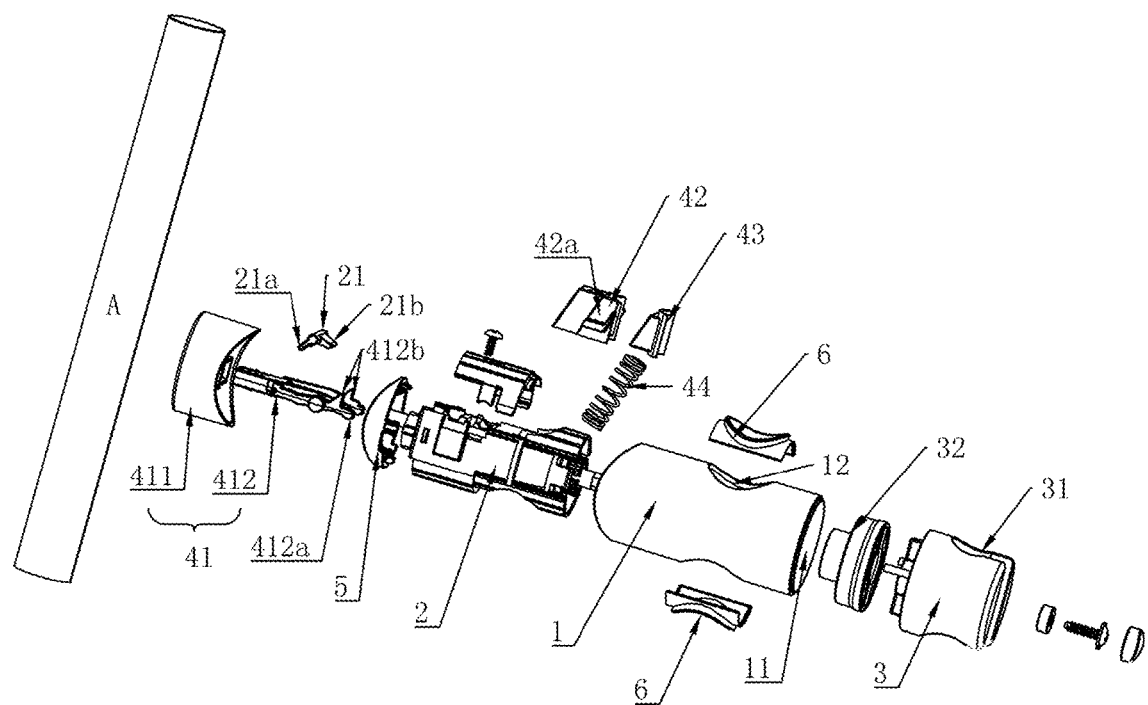
FIG. 2 is an exploded view of a slide-easy slide seat structure for a portable and liftable rod according to an embodiment of the present invention.
Figure 3:
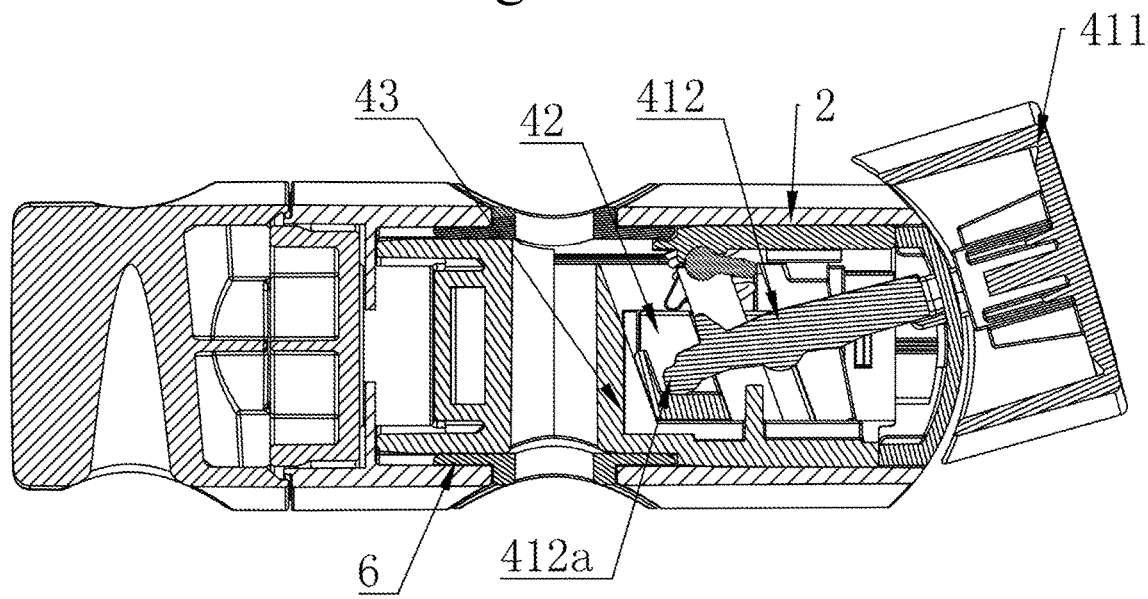
FIG. 3 is a cross section view of a slide seat according to an embodiment of the present invention.

As shown in FIGS. 1 to 3, the present invention provides a slide-easy slide seat structure for a portable and liftable rod, that includes: a slide sleeve 1, a main body 2, an insertion seat 3, and a hold tight mechanism. The slide sleeve 1 includes a hollow portion 11 and a through-hole 12, the main body 2 is fixed to the hollow portion 11 of the slide sleeve 1. Wherein, the profile, namely the cross section of the through hole 12 corresponding to that of liftable rod A, so that it is adapted to adjust the height of the slide seat, to suit the requirements of the various users, One end of the slide sleeve 1 is connected to the insertion seat 3, for example, they can be connected through using a positioning sleeve 32, or other ways and means known in this field, but it will not be repeated here for brevity. On the other side of the insertion seat 3 is disposed an indent slot 31, and that is used to fix shower head.

In the following, the hold tight mechanism is explained in detail: the hold tight mechanism includes a control sway rod 41, a movable piece 42, a hold tight piece 43, and a restoring spring 44. One end of the control sway rod 41 is disposed in the main boy 2, and a central portion of the control sway rod 41 is hinged to the main body 2. In other words, the control sway rod 41 and the main body 2 are moveably connected. A certain point of control sway rod 41 may perform rotations around the main body 2, such that control sway rod 41 forms into and includes a support point in the main body 2. Here, the central portion merely means a certain point on the control sway rod 41 except the of the end point of the control sway rod 41, but that does not mean a central position point. Preferably, control sway rod 41 may include at least two control sway rods 41 disposed in symmetry, so that it could save efforts requiring to press down the movable piece 42.

One end of restoring spring 44 is disposed in the main body 2, and the other end of the restoring spring 44 is connected to the movable piece 42, for example, the restoring spring 44 can be disposed in the main body 2 in a slant way, to act in cooperation with slide of the movable piece 42. The movable piece 42 is disposed in the main body 2 and having a slant slide face C; the slant slide face C approaches a liftable rod A along a longitudinal direction B. The extension face on the top end of the slant slide face C intercepts the liftable rod A. It is known that, the main body 2 also has a slant face (not shown), so that the movable piece 42 is able to move relative to the main body 2. The hold tight piece 43 is disposed in the main body 2, one end of hold tight piece 43 is located close to the movable piece 42, to act in cooperation with the slant slide face C of the movable piece 42; the other end of the hold tight piece 43 is pressed against the liftable rod A. The hold tight piece 43 can be detached from the liftable rod A through its cooperation with the control sway rod 41 and the movable piece 42.

Figure 4:
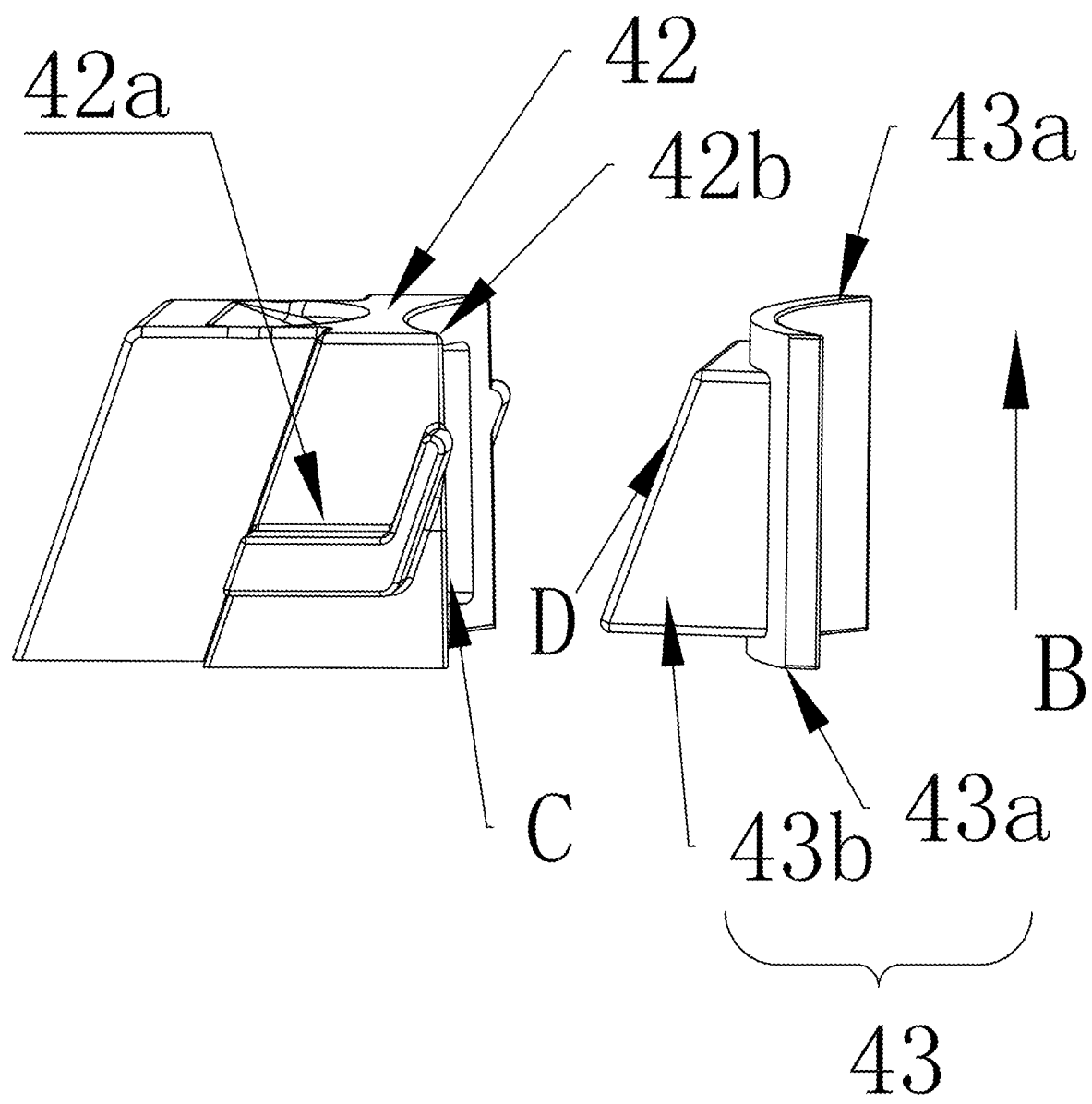
FIG. 4 is an enlarged schematic diagram of a hold tight piece and a movable piece according to an embodiment of the present invention.

Preferably, one end of the control sway rod 41 extending into the main body 2 is disposed an extension portion 412a. Preferably, the extension portion 412a is a press plate having a certain arc. Wherein, as shown in FIG. 4, both sides of the movable piece 42 are each disposed a receiving flat table 42a acting in cooperation with the extension portion 412a. As such, when pushing the control sway rod 41 downward, the control sway rod 41 is well positioned on the movable piece 42. Therefore, deviation is minimal while its reliability and accuracy are raised. Moreover, when pushing the control sway rod 41 upward, the control sway rod 41 or the extension portion 412a. will press the movable piece 42 downward, and then the removable piece 42 makes the hold tight piece 43 to be separated from the liftable rod A, so that the slide seat is able to slide relative to the liftable rod A. In the present invention, the principle of lever is used to directly make use the pushing of the control sway rod 41 to adjust the height of the slide seat. The advantages of this design are that: it requires less effort to operate, it facilitates elderly and handicapped person to take a shower, it is compact in structure and is convenient to use, while giving a good sense of aesthetics.

In order to reduce the friction and wearing between the slide sleeve 1 and the main body 2, a bushing 6 is disposed between the outer perimeter of the main body 2 and the inner perimeter of the slide sleeve 1, to increase durability and service life of the structure.

Refer to FIGS. 2 and 3, in the present invention, the control sway rod 41 includes a control button 411, and a connection press rod 412 connected thereto, with one end of the connection press rod 412 extending into the main body 2. To be more specific, the connection press rod 412 and the main body 2 are movably connected, and a central portion of the connection press rod 412 is hinged to the main body 2. In this respect, a certain point of connection press rod 412 is able to rotate around the main body 2, namely, the connection press rod 412 forms and includes a pivot point in the main body; while the other end of the connection press rod 412 extends outside the main body 2, and is connected to the control button 411. The control button 411 is connected and fixed to the connection press rod 412, for example through snap-fit, to felicitate the user to control the height of the slide seat. Preferably, an inner cover 5 is disposed between the control button 411 and the main body 2. The contour of the inner cover 5 corresponds to that of the control button 411. The inner cover 5 is provided with a narrow hole portion (not shown), so that the connection press rod 412 is able to move along the narrow hole portion. For example, when the connection press rod 412 is pushed upward, the narrow hole portion is able to restrict the position of the connection press rod 412, to protect the structure the main body 2, and to prolong the service life of the control sway rod 41.

Refer to FIG. 4, the hold tight piece 43 includes a friction pad 43a and a protrusion plate 43b. A front face of the friction pad 43a is pressed against the liftable rod A, a back face of the friction pad 43a is disposed the protrusion plate 43b. The protrusion plate 43b has a slant face D near the movable piece 42, the slant face D is close to the friction pad 43a along a longitudinal direction B. Herein, the longitudinal direction B refers to the longitudinal extension direction, when the friction pad 43a is put into the main body 2. This longitudinal extension direction is in line with the longitudinal direction B of FIG. 1. The slant face D getting close to the liftable rod A. The protrusion plate 43b acts in sliding cooperation with the movable piece 42. Namely, the slant face D of the protrusion plate 43b and the slant slide face C of the movable piece 42 is able to slide relative to each other. When the movable piece 42 slides downward relative to the hold tight piece 43, the slant slide face C of the movable piece 42 slides relative to a slant face D of the protrusion plate 43b, to bring the friction pad 43a into separation with the liftable rod A. The ways and means mentioned above are simple in structure and are not liable to be damaged. As such, a minimum force is required to adjust the height of the slide seat and without feeling any blockings. Preferably, on a top portion of the slant slide face C is disposed a protrusion table 42b. When the structure of the present invention is in a hold tight state, the connection between the slant slide face C of the movable piece 42 and a slant face D of the protrusion plate 43b, is tight and compact, to have a certain position restriction effect for the friction pad 43a, to achieve better hold tight of the liftable rod A.

Figure 5:
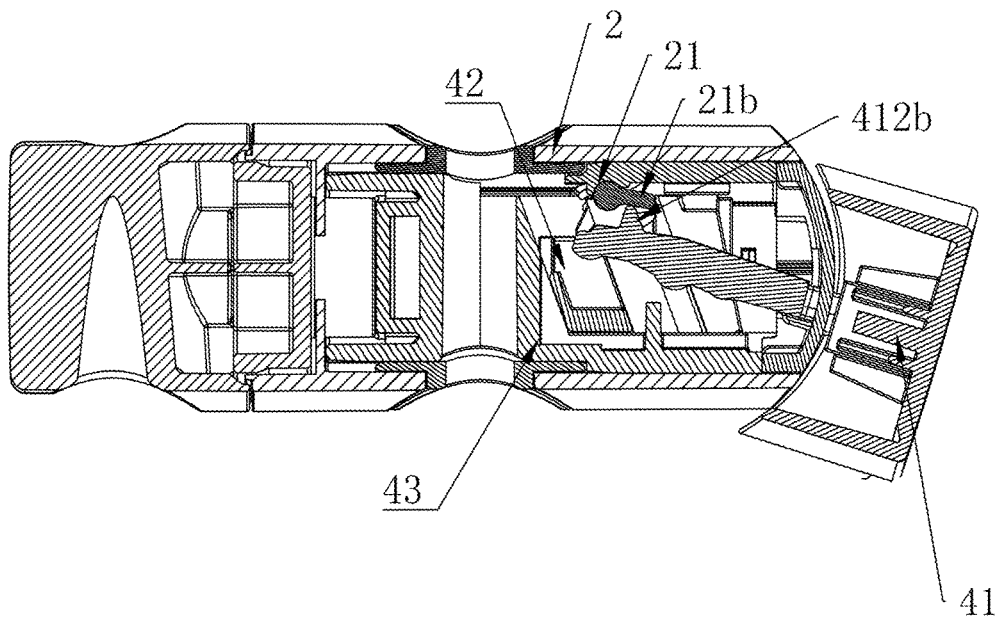
FIG. 5 is a cross section view of a slide seat according to another embodiment of the present invention.

In the following, refer to FIG. 5 for a detailed description of another embodiment of the present invention. Herein, the similar elements and contents of the two embodiments are omitted for brevity. In this embodiment, the slide-easy slide seat structure for a portable and liftable rod further includes a rotation axis connection rod 21, the rotation axis connection rod 21 is disposed in the main body 2 and is hinged to the main body 2. The rotation axis connection rod 21 is adapted to rotate relative to the main body 2. Namely, a pivot point is located between the rotation axis connection rod 21 and the main body 2. The rotation axis connection rod 21 is disposed opposite to the movable piece 42. When the control sway rod 41 is pushed downward, the control sway rod 41 brings the rotation axis connection rod 21 to press down the movable piece 42. As such, the movable piece 42 brings the hold tight piece 43 to separated from the liftable rod A, so that the slide seat is able to slide relative to the liftable rod A to adjust its height. Preferably, as shown in FIGS. 2 to 5, the rotation axis connection rod 21 includes an extension plate 21a and a press plate 21b. On a side of the connection press rod 412 is disposed a protrusion portion 412b. In operation, the protrusion portion 412b can be made to push the press plate 21b upward, to bring the rotation axis connection rod 21 into rotation, hereby bringing the extension plate 21a of the rotation axis connection rod 21 to rotate, to press the movable piece 42 downward, to make the movable piece 42 to bring the hold tight piece 43 to separate from the liftable rod A. Preferably, as shown in FIG. 2, control sway rod 41 may include at least two connection press rods 412 disposed in symmetry to each other. The opposite two sides of the plurality of the connection press rods 412 are each disposed a protrusion portion 412b, to save the force and efforts required in pushing the movable piece 42 downward. More preferably, an indent portion (not shown) is disposed in the press plate 21b correspond to the protrusion portion 412b. The indent portion and the protrusion portion 412b act in cooperation to receive the protrusion portion of control sway rod 41, so that the control sway rod 41 brings the rotation axis connection rod 21 into rotation without deviation, to raise the operation reliability of the control sway rod 41.

For this purpose, the rotation axis connection rod 21 acts to bring the connection rod, to press the movable piece 42 downward by means of gear linkage, the details of which belongs to the conventional technology, so it will not be repeated here for brevity. In the present embodiment, through the design of rotation axis connection rod 21, the control sway rod 41 utilizes the principle of lever to push the control button 411 upward or downward, to push the movable piece 42 downward, to cause the separation of the hold tight piece 43 and the liftable rod A, and to achieve height adjusting of the liftable rod A. This type of design is able to raise the control flexibility, reduce the force required to push up and down, while increasing the strength of the overall design, to provide convenience to the elderly and handicapped person taking a shower.

Figure 6:
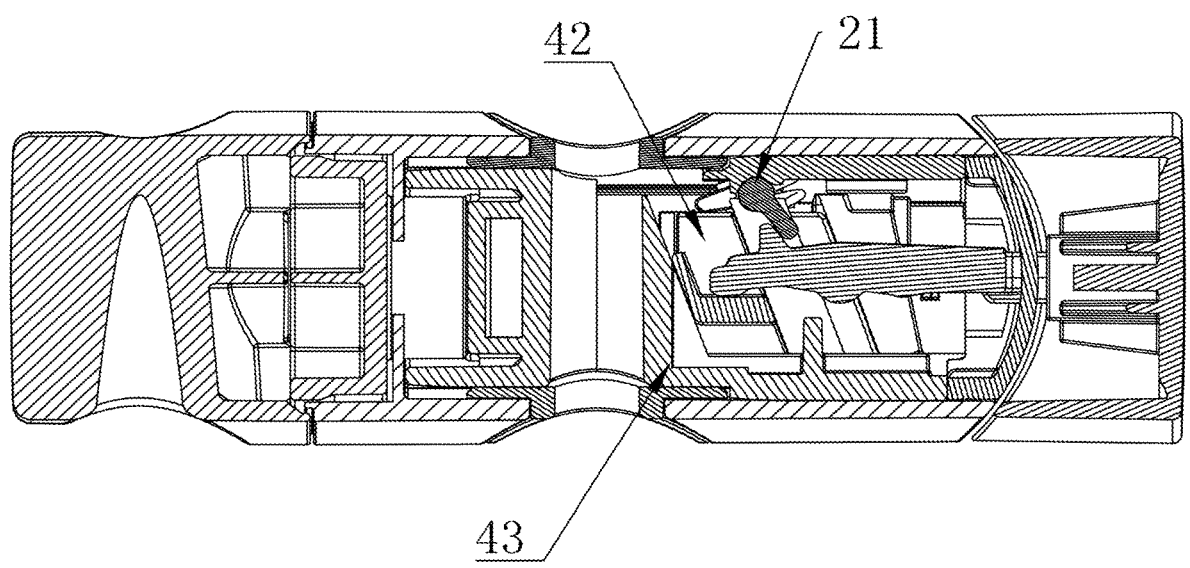
FIG. 6 is a cross section view of a slide seat in a hold tight state according to the present invention.
Figure 7:
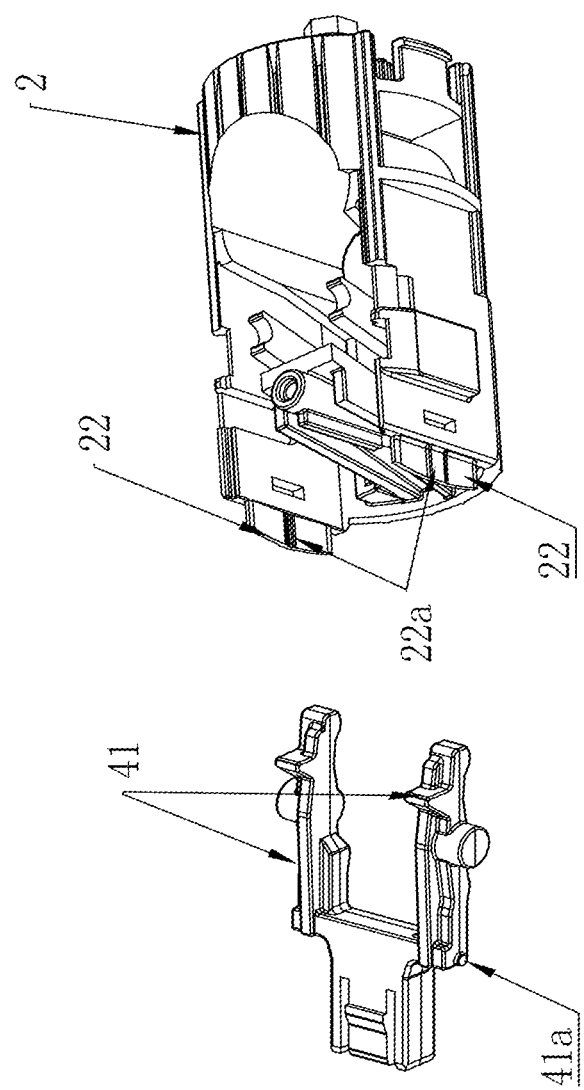
FIG. 7 is an exploded view of a slide seat in a hold tight state according to the present invention.

Refer to FIG. 6, when the outside force applied is removed, the restoring force of the restoring spring 44 brings the movable piece 42 or the rotation axis connection rod 21 back to its original position, the entire structure is in a hold tight state. At this time, the hold tight piece 43 presses against the liftable rod A, to fix the liftable rod A to a fix position, for the user to use the shower equipment such as a shower conveniently. Further, when the control sway rod 41 is restored to its original position under actions of the restoring spring 44, due to the principle of lever, the control sway rod 41 is caused to shake a little bit. At this time, to ensure the hold tight state of the hold tight piece 43, and to cause the control sway rod 41 to locate at a middle position, spring plates 22 can be disposed symmetrically around periphery of the main body 2. On the spring plates 22 are disposed indent bags 22a respectively, and on the control sway rod 41 is disposed protrusion bag 41a acting in cooperation with the indent bags 22. When the control sway rod 41 is restored into its original position, the protrusion bag 41a on the control sway rod 41, and the indent bag 22a on the spring plate 22 act in cooperation to achieve fixing, to prevent shaking of the control sway rod 41, and to fix the control sway rod 41.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A slide-easy slide seat structure for a liftable rod, comprising:
 a slide sleeve, a main body, an insertion seat, and a hold tight mechanism; wherein the slide sleeve includes a hollow portion and a through-hole, the main body is fixed to the hollow portion of the slide sleeve, and one end of slide sleeve is connected to the insertion seat; wherein, the hold tight mechanism includes a control sway rod, a movable piece, a hold tight piece, and a restoring spring; one end of the control sway rod is disposed in the main boy, and a pivot point of the control sway rod is hinged to the main body; one end of restoring spring is disposed in the main body, and the other end of the restoring spring is connected to the movable piece; the movable piece is disposed in the main body and having a slant slide face; the slant slide face approaches the liftable rod along a longitudinal direction of the liftable rod, one end of hold tight piece is located close to the movable piece, to engage in cooperation with the slant slide face of the movable piece; the other end of the hold tight piece is pressed against the liftable rod, so that the liftable rod is held tight; when the control sway rod sways perform rotations around the main body through the pivot point, the movable piece is driven to have the slant slide face disengaged from the hold tight piece, and the hold tight piece is detach from the liftable rod, so that the liftable rod is free from holding.

2. The slide-easy slide seat structure as claimed in claim 1, further comprising: a rotation axis connection rod, disposed in the main body, and is located opposite to the movable piece, when the control sway rod sways, the control sway rod brings the rotation axis connection rod to press the movable piece downward, and then the movable piece brings the hold tight piece to detach from the liftable rod.

3. The slide-easy slide seat structure as claimed in claim 2, wherein the rotation axis connection rod includes an extension plate and a press plate, on both sides of the control sway rod are each disposed a protrusion portion, and the protrusion presses against the press plate, to bring the extension plate to press the movable piece downward.

4. The slide-easy slide seat structure as claimed in claim 3, wherein the press plate has an indent portion, and the dent portion acts in cooperation with the protrusion portion.

5. The slide-easy slide seat structure as claimed in claim 1, wherein the hold tight piece includes a friction pad and a protrusion plate, a front face of the friction pad is pressed on the liftable rod, a back face of the friction pad is disposed the protrusion plate, the protrusion plate has a slant face, the slant face is close to the friction pad along a longitudinal direction, and the protrusion plate acts in sliding cooperation with the movable piece.

6. The slide-easy slide seat structure as claimed in claim 5, wherein on a top surface of the slant face of the movable piece is disposed a protrusion table.

7. The slide-easy slide seat structure as claimed in claim 1, wherein one end of the control sway rod extending inside the main body is disposed an extension portion, and each side of the movable piece is disposed a receiving flat table acting in cooperation with the extension portion.

8. The slide-easy slide seat structure as claimed in claim 1, wherein the control sway rod includes a control button, and a connection press rod connected thereto, with one end of the connection press rod extending into the main body, and with the other end of the connection press rod extending outside the main body, and is connected to the control button.

9. The slide-easy slide seat structure as claimed in claim 8, wherein an inner cover is disposed between the control button and the main body, and the inner cover is provided with a narrow hole portion, for the connection press rod to move along the narrow hole portion.

10. The slide-easy slide seat structure as claimed in claim 1, wherein around a periphery of the main body is disposed with a plurality of spring plates in symmetry, on each spring plate is disposed an indent bag, and on the control sway rod is disposed a protrusion bag acting in cooperation with the indent bag.

* * * * *